US005832583A

United States Patent [19]

Wason

[11] Patent Number: 5,832,583

[45] Date of Patent: Nov. 10, 1998

[54] GRINDING MILL LINER ADAPTER

[75] Inventor: Michael Wason, York, Pa.

[73] Assignee: Svedala Industries, Inc., Waukesha, Wis.

[21] Appl. No.: 662,452

[22] Filed: Aug. 5, 1996

Related U.S. Application Data

[62] Division of Ser. No. 316,927, Oct. 3, 1994, abandoned.

[51] Int. Cl.[6] .......... B23P 6/00

[52] U.S. Cl. .......... 29/401.1; 29/402.08; 29/403.1; 241/182

[58] Field of Search .......... 29/401.1, 402.08, 29/402.09, 403.1; 241/182

[56] References Cited

U.S. PATENT DOCUMENTS

| | | | |
|---|---|---|---|
| 1,174,160 | 3/1916 | Jensen | 241/183 |
| 1,534,000 | 4/1925 | Baker | 241/183 |
| 1,807,034 | 5/1931 | Hardinge | 241/182 X |
| 1,921,672 | 8/1933 | Haushalter | 83/9 |
| 2,216,784 | 10/1940 | Payne | 241/182 |
| 3,194,506 | 7/1965 | Bourne et al. | 241/182 |
| 3,318,537 | 5/1967 | Wallin et al. | 241/183 |
| 3,378,209 | 4/1968 | Crocheron | 241/182 |
| 4,177,955 | 12/1979 | Miller | 241/183 |
| 4,194,710 | 3/1980 | Ebner | 241/182 |
| 4,243,182 | 1/1981 | Dugger | 241/183 |
| 4,270,705 | 6/1981 | Larsen | 241/182 |
| 4,319,719 | 3/1982 | Larsen | 241/183 |
| 4,329,767 | 5/1982 | Nitti | 29/402.08 |
| 4,341,355 | 7/1982 | Hornberger | 241/102 |
| 4,580,734 | 4/1986 | Eroskey et al. | 241/182 |
| 4,609,158 | 9/1986 | Wilson | 241/182 |

*Primary Examiner*—Joseph M. Gorski

*Attorney, Agent, or Firm*—Kinney & Lange, P.A.

[57] ABSTRACT

An adapter for mounting a liner to a first mill having an inner diameter with a first contour. The liner has a back face with a second contour shaped for mating with a second mill. The adapter includes a top face and a bottom face. The top face supports the back face of the liner. The bottom face has a contour formed for mating with the contour of the first mill.

17 Claims, 6 Drawing Sheets

GRINDING MILL LINER ADAPTER

This is a divisional of application Ser. No. 08/316,927, filed Oct. 3, 1994 and now abandoned. Priority of the prior application is claimed pursuant to 35 USC §120.

BACKGROUND OF THE INVENTION

The present invention relates to methods and arrangements for supporting liners adapted to resist abrasion, corrosion and impact in mills used to grind cement materials, ores and similar materials. In particular, the present invention relates to a method and an apparatus for mounting a liner configured for use in a first mill to a second dissimilar mill.

Crushers, mills and various other apparatus are commonly used for crushing, grinding and comminuting ores, rocks and other hard and highly abrasive materials. Grinding mills are typically elongated hollow drums or shells which include openings for loading and discharging the materials while the shell is rotated about a horizontal axis or at a slight angle to the horizontal. During rotation, the material within the mill is lifted or carried up the ascending side of the shell and is tumbled back down over itself to grind or pulverize the material. This grinding may be autogenous, semi-autogenous, or media enhanced. In autogenous grinding, the material is used to crush itself. Semi-autogenous grinding employs large grinding media such as balls, typically five inches in diameter, to enhance the comminuting process. These added balls generally comprise only a small percentage of the total volume of the mill, approximately ten percent. Media enhanced grinding uses a large percentage of smaller grinding media in the mill, such as pebbles, balls (ball mills) or rods (rod mills). For example, ball mills typically employ two to two and one-half inch steel balls.

Many mills also include lifter bars secured to various interior surface portions of the mill. The lifter bars are typically provided longitudinally of the mill and at one or both of the annular end closures of the mill. The longitudinal lifter bars are disposed at selected circumferential spacings while the lifter bars at the ends of the mill are disposed along spaced radii extending from the axis of rotation. The lifter bars typically have a single surface perpendicular to the shell of the mill which lifts and carries the material up the ascending side of the shell.

Grinding mills are generally one of either primary or secondary types. Primary mills receive heavy mineral typically ten inches in size or greater and grind the material down to approximately ¼ inch in size. Secondary mills receive the smaller material and further grind the material from ¼ inch down to a face powder. Once the material is ground into a powder, minerals may be extracted either chemically or by floatational or other methods.

Autogenous and semi-autogenous mills are commonly used in the primary stage, while ball or rod mills are typically used in the secondary stage. Due to the large size of the material received, primary autogenous and semi-autogenous mills typically have a shell with a diameter from about thirty feet to about thirty-six feet. In contrast, ball or rod mills have shells that are generally about sixteen to twenty feet in diameter.

Due to the abrasion and impact of the ore materials, it is important to protect and insulate the outer shell of the mill. In addition, it is also necessary to provide a seal around an inside diameter of the cylindrical shell of the mill to protect the shell of the mill against the corrosive affect of the materials being ground. Typically, liners are attached to the inside diameter of the shell to serve these functions. Because of the extreme abrasion and impact that the liners must encounter, the liners wear over time. Consequently, it is important that the liners be replaceable. Due to the large size and weight of the liners, the liners are typically segmented or formed from a plurality of separate liner components or segments individually secured to the drum or shell of the mill. The liner segments are held within the cylindrical shell of the mill by bolts having heads received in tapered sockets which extend completely through the liner segments. Threaded shanks of the bolts pass through the holes within liner segments and the shell to threadably engage washers and nuts at the outer surface of the mill. Because the holes extend completely through the liner segments, the holes are a point of weakness within the liner segment where the segments typically crack or break due to wear and stress.

In smaller mills used in light duty applications where the balls and the feed material to be ground are small, rubber liners are used. Alternatively, such mills may also use composite liners formed from an inner rubber material with ceramic tile members fixedly adhered thereto. Because rubber liners or composite liners have wearing surfaces which wear at rates different than the metal bolts used to typically mount metal liner segments to the shells of the mills, rubber liners and composite liners are typically mounted to the shell by T-shaped bolts having flat, elongated heads which are positioned in T-shaped grooves formed centrally within the rubber portion of the liner. Although rubber and composite liners are well suited for secondary grinding applications, these liners are not sufficiently wear-resistant in primary applications where the feed material or the grinding media is large, or where the feed material is highly abrasive.

In contrast to smaller light duty mills, primary grinding autogenous and semi-autogenous mills typically use individual liner segments formed from extremely hard and wear-resistant metal such as white iron, perlitic steel or chrome alloys. Despite this, however, the liners still suffer from extreme wear over time. As a result, the individual liner segments must be replaced. Because of the large lifting effect necessary to lift media and material which are ten inches or greater in diameter, the liner segments used in primary grinding are usually removed from the mill when the lifting effect of the lifting bars is reduced from wear to approximately to two to two and one-half inches in height. Because each liner segment is extremely large and is constructed from hard, wear-resistant and expensive material, the cost associated with replacing a worn liner segment is extremely high. Typically, worn liners that are removed from the mill are either scrapped or returned for a small scrap value.

SUMMARY OF THE INVENTION

The present invention is a method and apparatus for extending the useful life of a worn liner which is configured for use in a first grinding mill. The liner is removed from the first grinding mill when the liner has been worn down through use to a point where the shape of its working face is no longer effective for use in the first grinding mill, but is effective for use in a dissimilar grinding mill. The worn liner is then coupled to the dissimilar grinding mill. To better couple the worn liner to the dissimilar grinding mill, an adapter is provided. The adapter has a top face for supporting the liner and a bottom face having a contour formed for mating with a contour of the second dissimilar grinding mill. The worn liner is positioned adjacent the top face of the adapter so that the worn liner and the adapter, together, may be mounted to the second grinding mill. The above method and apparatus allows liners configured for use in one grinding mill to be adapted for use in dissimilar grinding mills and permits worn liners to be reused in dissimilar grinding mills instead of being scrapped. The present invention extends the useful life of the liners and achieves cost savings.

DETAILED DESCRIPTION OF THE PREFERRED EMBODIMENTS

Throughout the specification of the application, various terms are used such as "top", "bottom", "above", "below", "inwardly", "outwardly", "vertical""upward", "downward", and the like. These terms denote directions with respect to the drawings and are not limitations of orientation of the present invention. Rather, these terms are provided for clarity in describing the relationship between surfaces and components of the liners and adapters between the liner assemblies and the shell of the grinding mill. As can be appreciated, rotation of the shell of the grinding mill will alter the overall orientation of the present invention.

Figure 1:
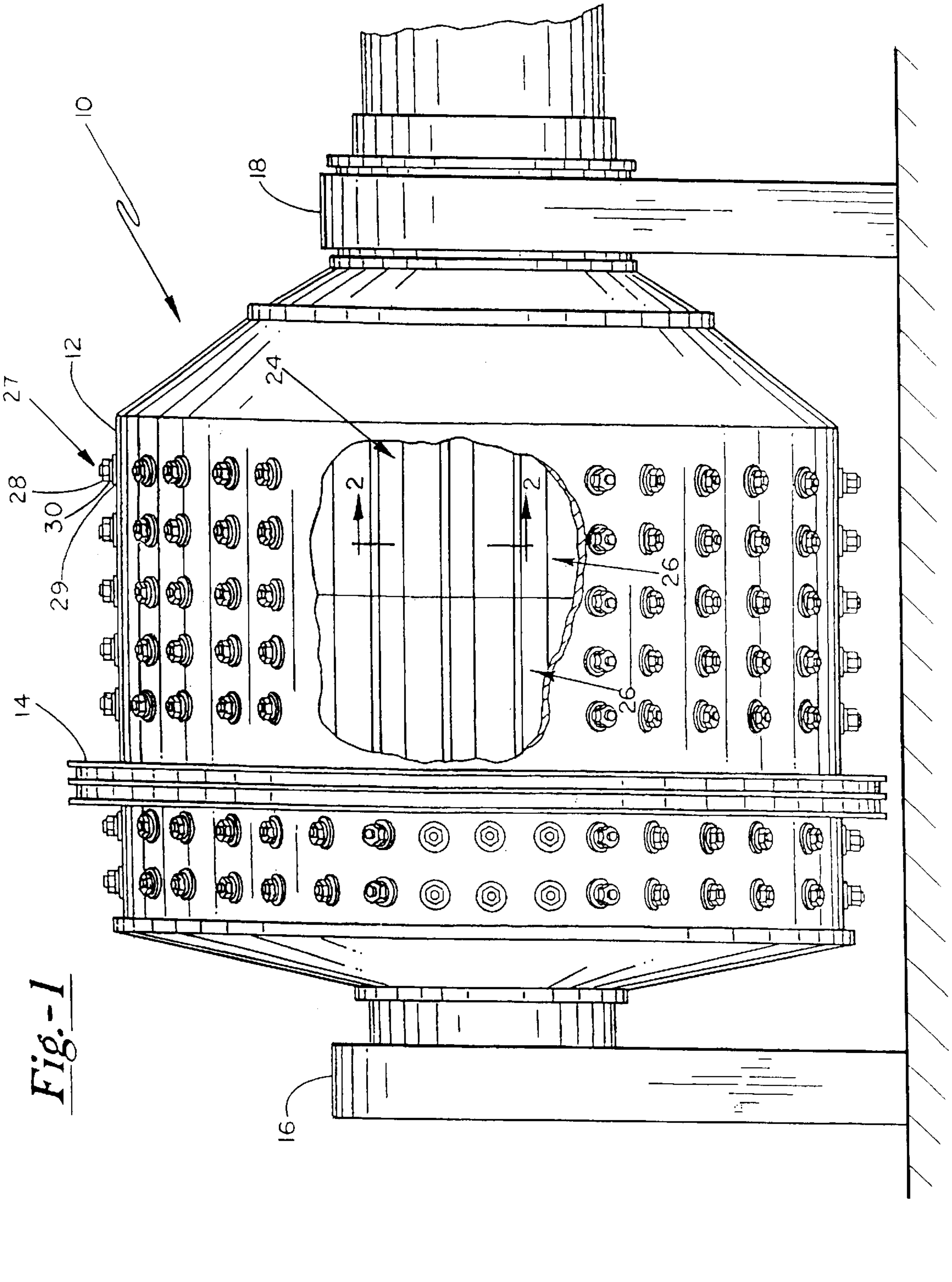
FIG. 1 is a side elevational view of a grinding mill with portions removed to illustrate liners coupled to a shell of the grinding mill.

FIG. 1 is a diagrammatic side elevational view of grinding mill 10 with portions removed to illustrate the interior of grinding mill 10. Grinding mill 10 is designed and sized for primary stage grinding (i.e., grinding down rocks from ten inches in size down to approximately ¼ inch in size) and includes a cylindrical receptacle or shell 12, girth or drive gear 14 and trunnions 16,18. Shell 12 is generally drum-shaped and defines an interior 24. Because shell 12 is designed for primary stage grinding, shell 12 preferably has an inner diameter sized for reception of rocks and other ores approximately ten inches in size. Preferably, shell 12 has an inner diameter of about thirty feet.

Shell 12 includes a plurality of rows of liners 26 which are mounted to an inside diameter of shell 12 by mounting or coupling mechanisms such as bolts 27, nuts 28 and washers 29,30. Heads of bolts 27 preferably fit within liners 26 and extend through shell 12. Each liner 26 is preferably about 12 to about 18 inches in length and includes at least two to four holes through which bolts 27 extend to mount liners 26 to shell 12. Nuts 28 threadably engage bolts 27 at the outer surface of shell 12 to compress rubber sealing washers 29 and metal washers 30 against shell 12 and to couple the liners 26 to shell 12. Liners 26 are mounted within shell 12 so as to contact and abut one another to provide a continuous liner and wearing surface along the inner diameter of shell 12. Liners 26 also include lifter bars for lifting material within shell 12. Shell 12 also includes liners at the ends of shell 12 along spaced radii extending from the axis of rotation (not shown). As a result, liners 26 fully cover and protect shell 12 of mill 10 from the wear and corrosive effect of the material being ground.

Trunnions 16,18 are conventionally known and contain bearings for rotatably supporting shell 12. Trunnions 16,18 are positioned on opposite ends of shell 12 and further define openings for introducing materials into shell 12 to be ground, and for introducing grinding elements or media into shell 12. Trunnions 16,18 are also used to remove ground material and grinding media from mill 10. Mill 10 is preferably a continuous feed-type, wherein both ends of shell 12 are open and whereby material is introduced into one end of shell 12 and removed from the other end to provide a continuous flow. Alternatively, mill 10 may be of a batch feed type as is conventionally known.

Drive gear 14 encompasses one end of shell 12 and is connected to suitable drive means, not shown but conventionally known in the art. Rotation of ring gear 14 rotates shell 12 about a horizontal axis, causing material fed into shell 12 to be lifted along the inner diameter of shell 12 by liners 26 and to be dropped upon itself to crush or grind the material.

Secondary stage grinding mills (not shown) are used to further grind material from approximately ¼ inch down to face powder are constructed similarly to mill 10 but are smaller in size, typically having an inner diameter of about sixteen to twenty feet. As a result, secondary stage grinding mills require liners having different profiles than the liners 26 used in primary stage grinding mills.

Figure 2:
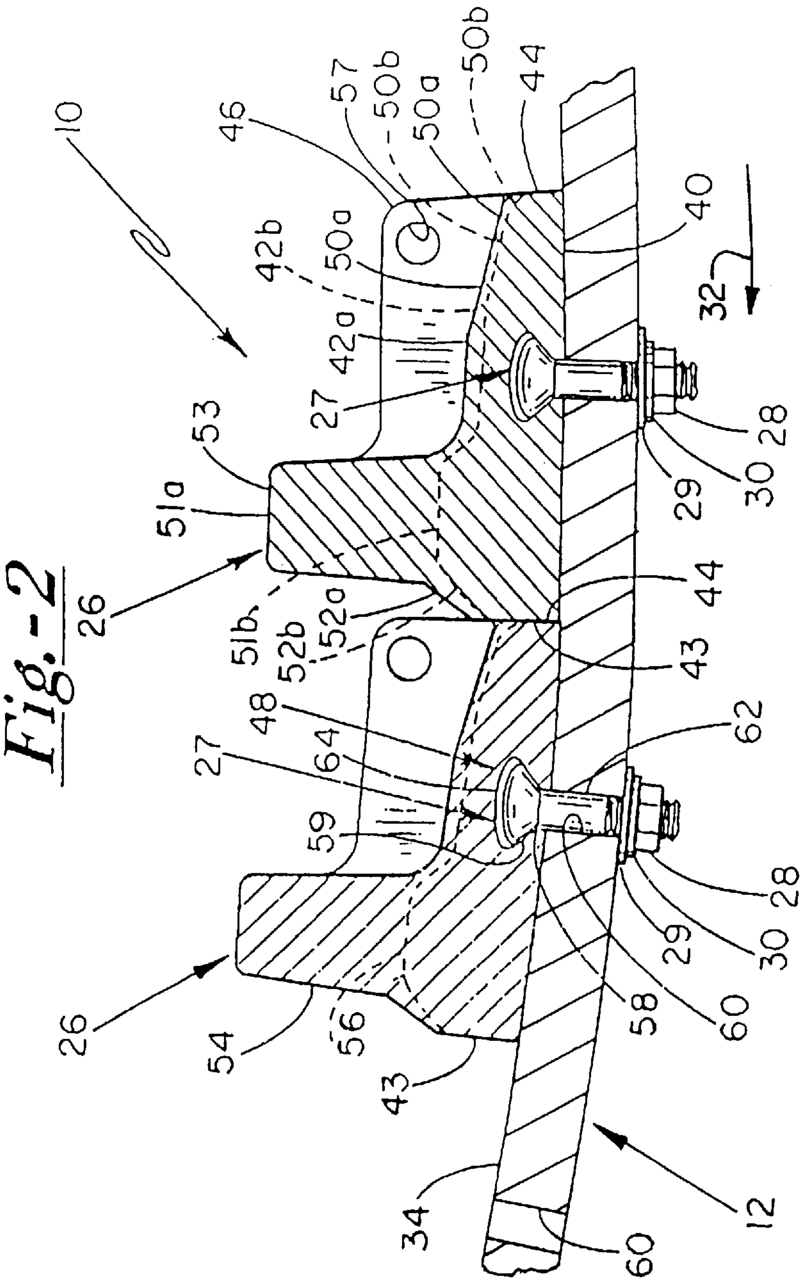
FIG. 2 is an enlarged fragmentary sectional view of portions of the mill of FIG. 1 showing the liners and the shell in greater detail.

FIG. 2 is an enlarged fragmentary sectional view of portions of mill 10 showing two adjacent liners 26 in greater detail. As best shown by FIG. 2, liners 26 are mounted adjacent to one another along an inner diameter 34 of shell 12 so as to provide a continuous seal or lining along the inner diameter 34 of shell 12. Each liner 26 includes a bottom surface or back face 40, a top or working face 42*a*, front edge 43, rear edge 44, lifting lug 46 and slot 48. Back face 40 is generally opposite working face 42*a* and has a contoured shape or curve for mating with inner diameter 34 of shell 12. Preferably, the contour of back face 40 is convex, while inner diameter 34 of shell 12 is concave. Because the contour of back face 40 mates with inner diameter 34 of shell 12, gaps between shell 12 and liner 26 are sealed and eliminated. As a result, no gaps exist where corrosive material may contact and damage shell 12 of mill 10.

The top face or working face 42*a* of liner 26 extends upwardly away from back face 40 and includes trailing portion 50*a*, lifting portion 5*a* and leading portion 52*a*. Trailing portion 50*a* longitudinally extends along a rearwardmost side of liner 26 and slants slightly upward away from back face 40. Trailing portion 50*a* preferably has a thickness of about three inches at edge 44 and a thickness of about four inches near lifting portion 51*a*.

Working face 42*a* extends vertically upward away from trailing portion 50*a* and back face 40 to form lifting portion 5*a*. Lifting portion 51*a* preferably projects upwardly from back face 40 above trailing portion 50*a* to produce a lifting effect suitable for autogenous and semi-autogenous grinding mills. Lifting portion 51*a* preferably has a height of about nine inches above trailing portion 50*a*. As a result, lifting portion 51*a* produces a lifting effect of at least about eight inches so that lifting portion 51*a* effectively lifts materials and media which is eight to ten inches in diameter and size. Lifting portion 51*a* includes top surface 53 and lifting surface 54 which lifts and carries material up an ascending side of shell 12 so that the material tumbles down over itself to grind or pulverize itself.

Leading portion 52*a* longitudinally extends between edge 43 and lifting portion 51*a* opposite trailing portion 50*a*. Leading portion 52*a* has a contour which slopes upward from front edge 43 to lifting portion 51*a*. Leading portion 52*a* lines or covers and protects shell 12.

Leading portion 52*a* slopes upward from front edge 43 to lifting surface 54 of lifting portion 51*a*. Leading portion 52*a* extends upward at an angle of at least twenty degrees with respect to the vertical. Preferably, leading portion 52*a* slants upward at an angle between about twenty-five degrees to about thirty-five degrees and optimally at an angle of about thirty degrees with respect to the vertical. Leading portion 52*a* preferably has a thickness of about four inches at edge 43 and a thickness of about five inches at lifting portion 51*a*. Consequently, lifting portion 51*a* extends above leading portion 52*a* by about eight inches and above edge 44 by about nine inches. Because working face 42 of each liner 26 is designed to include leading portion 52*a*, liner 26 is well suited for use in secondary stage grinding mills, such as ball mills, when lifting portion 51*a* wears down to about two to two and one-half inches in height above trailing portion 50 or when lifting surface 54 is substantially worn away. When lifting portion 51*a* wears down such that a top of lifting portion 5l*a* is first contiguous with leading portion 52*a*, liner 26 is adaptable for use in secondary stage grinding mills.

To withstand the abrasion, wear and corrosion created by the materials ground within mill 10, liners 26 are formed from a hard, abrasion-resistant material such as white iron, perlitic steel or chrome alloys. However, despite the use of these relatively abrasion-resistant materials, working face 42 of each liner 26 wears down. Because lifting portion 51*a* projects above trailing portion 50*a* and leading portion 52*a*, lifting portion 51*a* wears at an accelerated rate, reducing the lifting effect produced by lifting surface 54 of lifting portion 51*a*. When the lifting effect produced by lifting portion 51*a* and leading portion 52*a* is reduced to approximately two to two and one-half inches in height, liner 26 loses its effectiveness for use in autogenous and semi-autogenous grinding mills which require greater lifting effect produced by leading portion 52*a* and lifting surface 54 of lifting portion 51*a*.

However, it has been discovered that when top face 53 of lifting portion 51*a* is worn to approximately two to two and one-half inches above trailing portion 50*a*, working face 42*a* has a profile well-suited for use in secondary stage grinding mills such as ball mills, which do not require as large of a lifting effect. As a result, when working face 42*a* has worn down through use to a point where the shape of working face 42*a* is no longer effective for use in primary grinding mills such as autogenous or semi-autogenous grinding mills, but is effective for use in dissimilar, secondary grinding mill applications, liner 26 is removed from shell 12 and is coupled to the dissimilar grinding mill for further use. Thus, the useful life of liner 26 is effectively extended. Preferably, liner 26 is removed from shell 12 when working face 42*a* has worn down to the contour shown by dashed line 56 in FIG. 2.

Dashed line 56 illustrates a working face 42*b* of a worn liner having trailing portion 50*b*, lifting portion 51*b* and leading portion 52*b*. Trailing portion 50*b*, lifting portion 51*b* and leading portion 52*b* extend generally parallel to the original working face 42*a*, except that lifting portion 51*b* has a more gradual interface with trailing portion 50*b* and initially extends above trailing portion 50*b* by about two to about two and one-half inches. Because of the original slope or slant angle of leading portion 52*a*, leading portion 52*b* is also slanted at a similar angle after generally uniform wear. Because leading portion 52*b* is slanted at an angle of at least twenty degrees with respect to the vertical, preferably twenty-five degrees to thirty-five degrees and optimally at thirty degrees with respect to the vertical, material and grinding media are optimally carried up the ascending side of the drum and thrown away from the ascending side of the drum to most effectively grind material. At an angle of less than twenty degrees with respect to the vertical, grinding media and material does not stay in a compact charge along the shell of the mill. At less than twenty degrees, the leading portion carries the grinding media and material too high and throws the material and media too far from the shell. As a result, the grinding media and material do not remain in sufficient contact with one another to most effectively grind the material. In contrast, at an angle of forty-five degrees with respect to the vertical, leading portion 52*b* does not effectively lift the material high enough to maximize grinding of the material because the material slips along the sides of shell 12. To maximize the grinding efficiency, leading portion 52*b* preferably has an angle of between about twenty-five degrees to about thirty-five degrees and optimally at thirty degrees with respect to the vertical. Working face 42*b* is well-suited for use in secondary grinding mills such as ball mills which do not require as great of a lifting effect from the liners. As can be appreciated, the optimum angles for leading portion 52*b* will vary slightly depending upon the diameter of the mill, the rotational speed of the mill, and the height of leading portion 52*b*.

Edges 43,44 longitudinally extend along sides of each liner 26. Edge 43 preferably has a height of about four inches, while edge 44 preferably has a height of about three inches. As shown by FIG. 2, liners 26 are mounted to shell 12 so that edges 43 and 44 abut and contact adjacent edges 44 and 43, respectively, of adjacent liners 26 to provide a continuous wearing and lining surface along inner diameter 34 of shell 12. Edges 43 and 44 may be additionally configured to interlock and engage with adjacent edges of adjacent liners.

Preferably, lifting lug 46 integrally projects from trailing portion 50*a* at a longitudinal midpoint of liner 26. Lifting lug 46 is formed with a large aperture 57 which permits liners 26 to be lifted into place. Lifting lugs 46 wear away over time through use of liner 26 so that liner 26 becomes gradually lighter before being reused in a dissimilar grinding mill after lifting portion 51*a* has worn down.

Slot 48 comprises a V-shaped slot or groove longitudinally extending along and through liner 26. Slot 48 preferably is centered between edges 43,44 along the entire longitudinal length of liner 26. Alternatively, slot 48 longitudinally extends through liner 26 along portions of liner 26 with a length sufficient to account for various mounting hole pitches within various grinding shells, including shell 12. Slot 48 projects inward from back face 40 toward working face 42*a*, but below dashed line 56 of liner 26. Slot 48 includes channel 58 and shoulder 59. Channel 58 extends inwardly from back face 40 into liner 26 and widens to form shoulder 59. Channel 58 receives shank 62 of V-shaped bolts 27. Shoulder 59 supports the head 64 of bolt 27 within slot 48 so that bolt 27 extends through mounting hole 60 to threadably engage nut 28 to couple liner 26 to shell 12. Because slot 48 is generally V-shaped, shoulder 59 is thicker where head 64 of bolt 27 engages liner 26. As a result, liner 26 is less likely to crack or break around bolt 27. In addition, liner 26 is coupled to shell 12 in a stronger and more stable manner than as if a standard T-bolt were used. Because slot 48 does not extend all the way through liner 26, holes completely extending through liner 26 where cracks and breaks typically form are eliminated. Because adapter slot 48 longitudinally extends along liner 26, slot 48 is always in longitudinal alignment with mounting holes 60 within shells of different grinding mills regardless of the particular spacing or pitch of the mounting apertures or holes of the shells. As a result, slot 48 permits liner 26 to be easily coupled to shells having various mounting hole spacings or pitches different than that of shell 12. Slot 48 also permits liner 26 to be coupled to additional components, such as the adapters shown in FIGS. 3–5.

Figure 3:
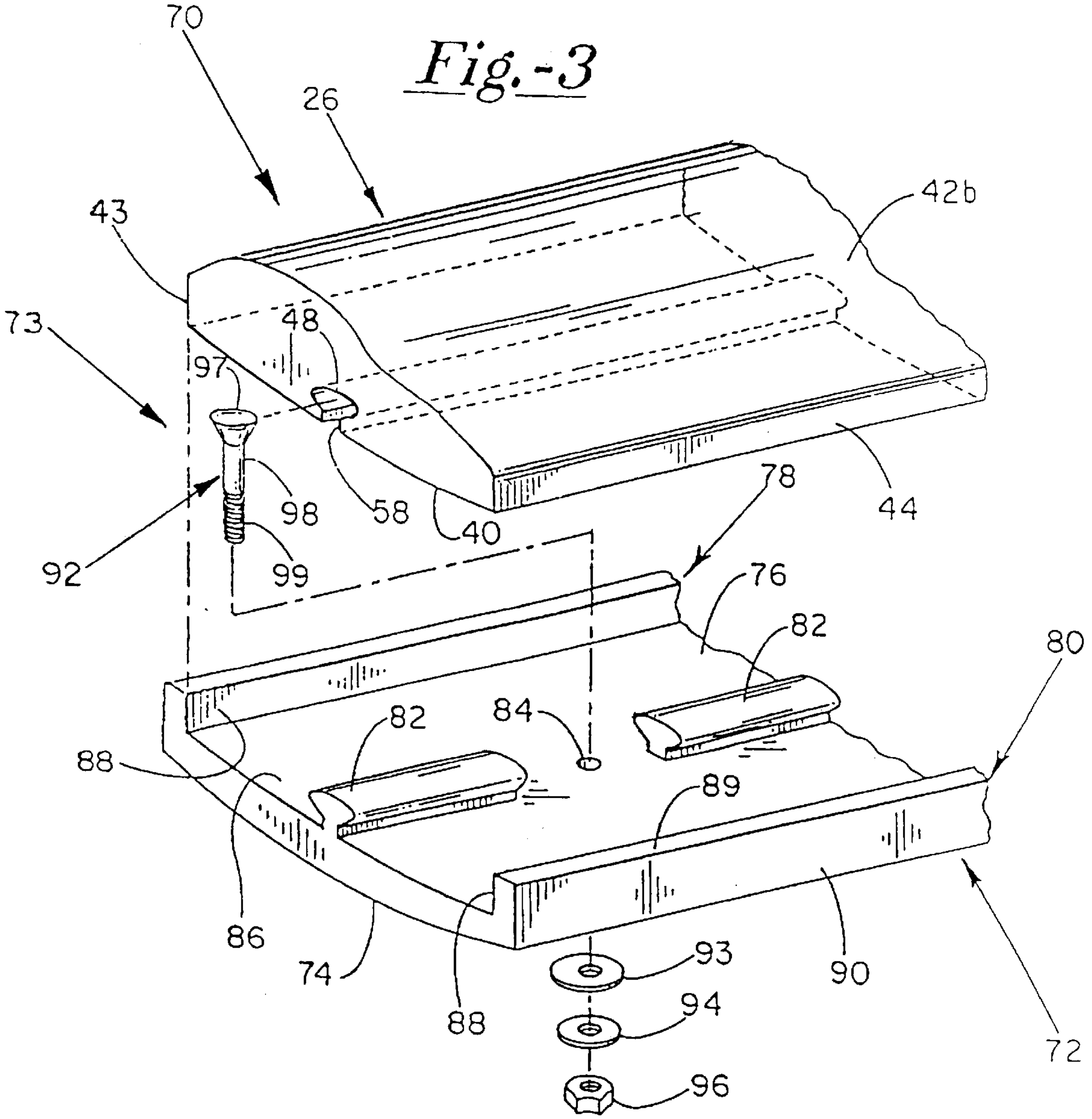
FIG. 3 is an exploded fragmentary perspective view of a liner assembly for being mounted to a grinding mill.

FIG. 3 is an exploded fragmentary perspective view of a liner assembly 70 which includes liner 26, liner adapter 72 and coupling mechanism 73. For ease of illustration, only front portions of liner 26 and adapter 72 are shown. Remaining portions of liner 26 and adapter 72 are substantially identical to the front portions shown. Adapter 72 is configured for being coupled to liner 26 when liner 26 is mounted to a grinding mill having a shell which is dissimilar to shell 12 of mill 10 in which liner 26 was originally used. Adapter 72 is a generally elongated rectangular member which includes bottom face 74, top face 76, sidewalls 78,80, lugs 82 and mounting hole 84. Bottom face 74 is preferably configured for mating with a grinding mill having an inner diameter contour dissimilar to the inner diameter contour of grinding mill 10 shown in FIGS. 1 and 2. Bottom face 74 preferably has a contour which mirrors the contour of the dissimilar grinding mill. For example, if the cylindrical shell of the dissimilar grinding mill curves inwardly with a predetermined concavity, the contour of back face 74 preferably curves outwardly with a corresponding convexity. As a result, back face 74 of adapter 72 conforms to the contour of the inner diameter of the dissimilar grinding mill to seal and prevent any gaps from being formed between adapter 72 and the inner diameter of the dissimilar grinding mill.

Top face 76 extends generally opposite to bottom face 74 and is configured for supporting back face 40 of liner 26. Top face 76 preferably has a contour which mirrors, mates and closely conforms with back face 40 so that adapter 72 provides uniform strong support for liner 26. As a result, top face 76 of adapter 72 better supports liner 26 to prevent uneven stresses within liner 26 which would otherwise cause liner 26 to crack or break. For example, if back face 40 of liner 26 curves outward with a predetermined convexity, top face 76 of adapter 72 curves inward with a corresponding concavity. As a result, top face 76 of adapter 72 may be snugly fit against back face 40 of liner 26 while bottom face 74 of adapter 72 is snugly fit against the inner diameter of the dissimilar grinding mill to provide a firm and sturdy connection between liner 26 and the shell of the dissimilar grinding mill. Moreover, adapter 72 allows liner 26 having back face 40 which is configured for being mounted to shell 12 of grinding mill 10 to be additionally mounted to other grinding mills having different shells with different inner diameter contours. Adapter 72 not only extends the useful life of worn liners, but also provides increased flexibility by allowing a single liner to be adapted for mounting on any one of various grinding mills having different shell sizes and configurations.

Figure 5:
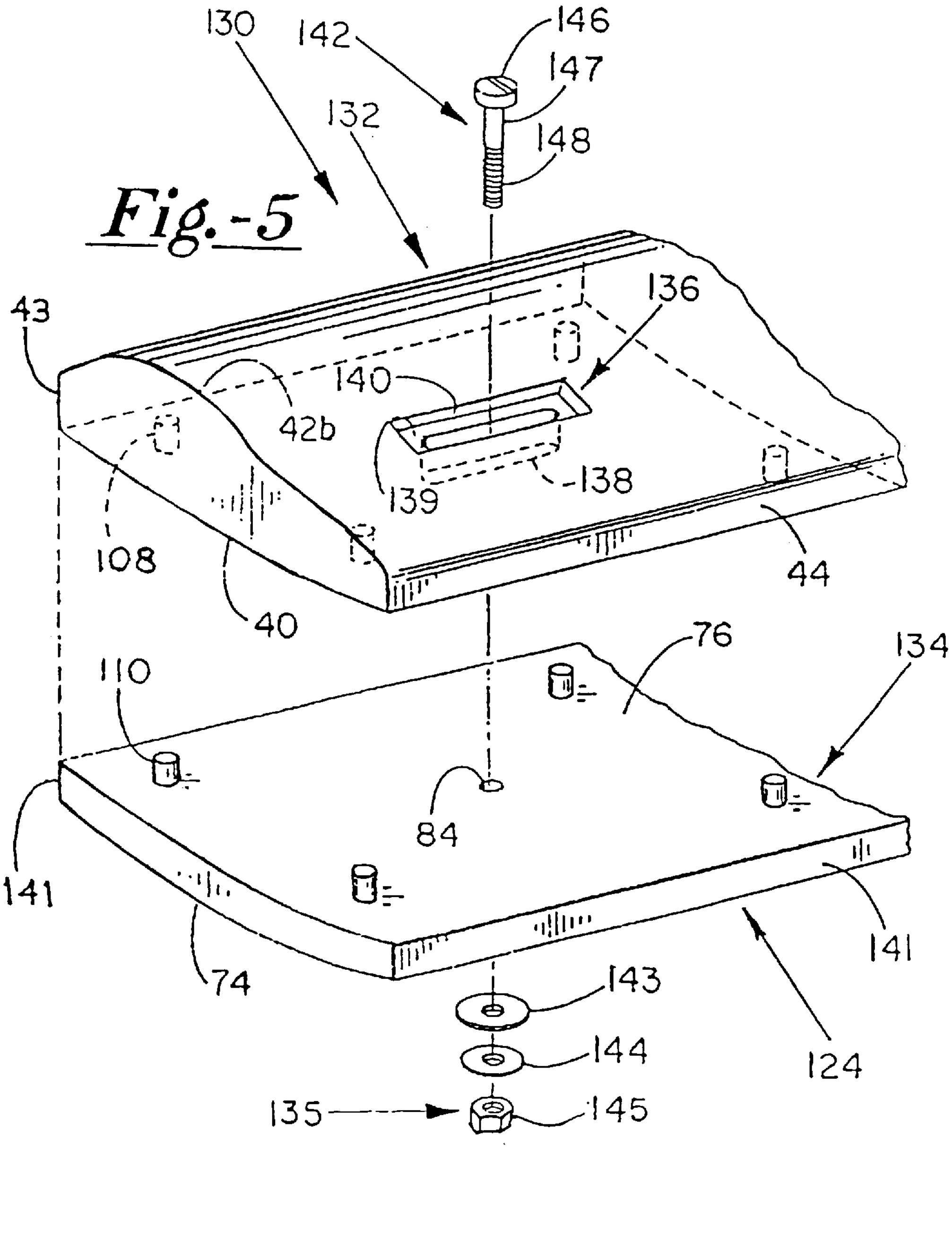
FIG. 5 is an alternate embodiment of the liner assembly of FIG. 4.

Outer lips or sidewalls 78,80 longitudinally extend along the sides of adapter 72. Sidewalls 78,80 project above top face 76 and are spaced opposite from one another to define channel 86 for receiving liner 26. Each sidewall 78,80 includes an inner surface 88, a top surface 89 and an outer side surface 90. Top face 76 and inner surface 88 of sidewalls 78 and 80 define channel 86. Preferably, inner surfaces 88 are spaced apart from one another at a distance approximately equal to a width of liner 26 so as to snugly fit against side edges 43 and 44 of liner 26. Top surface 89 extends along a portion of the perimeter of liner 26 at or below working face **42*b* of liner 26. Top surface 89 serves as a secondary, corrosion-resistant, wearing surface below and between working faces 42*b* of adjacent liners 26. Top surface 89 preferably has a height above bottom face 74 of between about three to about four inches. Outer surface 90 extends around the sides of adapter 72 and is configured for abutting and mating with an outer side surface 90 of an adjacent adapter 72. Outer surface 90 may be alternatively configured to lock and inter-engage with an outer side surface of an adjacent adapter. Outer surface 90 of sidewalls 78,80 forms a seal between an adjacent adapter 72 mounted along an inner diameter of a grinding mill. Sidewalls 78,80 fill in gaps between adjacent liners mounted to the shell of the grinding mills. As a result, sidewalls 78 and 80 of adapter 72 provide a seal between the material being ground and the shell of the grinding mill and thus allow liners of different widths to be mounted within different grinding mills. As can be appreciated, the height and width requirements of sidewalls 78,80 will vary depending upon the size of the gap between adjacent liners caused by the liners being smaller than the space needed to fully occupy the space in the dissimilar grinding mill. Adapter 72 may alternatively be provided with a single outer lip or sidewall which abuts either edge 43 or edge 44 to fill in the gap between adjacent liners and to seal between adjacent liners. Furthermore, in cases where liners 26 fully occupy and seal the space around the inner diameter of the grinding mill, sidewalls 78,80 may be omitted from adapter 72, as shown by FIG. 5**.

Lugs 82 project upwardly from top face 76 between inner surface 88 of sidewalls 78,80. Lugs 82 longitudinally extend along a center line of adapter 72 and are preferably spaced apart from one another at opposite ends of adapter 72. Each lug 82 is configured for slidably mating within corresponding slot 48 of liner 26. Lugs 82 preferably are V-shaped so as to lock within slot 48 of liner 26. Because lugs 82 are V-shaped to engage V-shaped slot 48, lugs 82 are thicker and stronger where lugs 82 contact slot 48. Moreover, lugs 28 may be easily positioned within slots 48 which are already formed within liner 26 for mounting liner 26 to the grinding mill. Alternatively, other lug/slot arrangements may be used, such as T-shaped slots and T-shaped lugs. Lugs 82 permit adapter 72 to be releasably coupled to liner 26 so that adapter 72 and liner 26 may be handled as one single piece during installation within a grinding mill. Lugs 82 additionally assure that adapter 72 is properly positioned adjacent liner 26 when being mounted to the grinding mill. Consequently, installation of liner assembly 70 is easier and less time-consuming.

Mounting hole 84 extends through adapter 72 from top face 76 out bottom face 74. Mounting hole 84 is preferably positioned along adapter 72 so as to be in coaxial alignment with mounting holes or apertures extending through a shell of a grinding mill for which adapter 72 is configured. Mounting hole 84 permits bolts or other conventional fastening means to extend through adapter 72 to couple adapter 72 as well as liner 26 to the grinding mill.

Adapter 72 is preferably formed from a corrosion resistant, resilient material. Preferably, adapter 72 is formed from a rubber, styrene-butadiene (sbr), having a hardness of about 60 shore A (durometer), a tensile strength of about 2,485 psi and compressibility before crushing of between about 80 to 90 percent. Alternatively, other materials may be used to form adapter 72 such as plastics, including high density polyethylene or polyurethane.

Coupling mechanism 73 is configured for use with liner assembly 70 and includes V-bolt 92, rubber sealing washer

93, metal washer 94 and nut 96. Bolt 92 includes head 97, shank 98 and threaded end 99. Head 97 is generally V-shaped, having downwardly tapered sides and a flat top. Head 97 is shaped for being received within V-shaped groove 48 within liner 26. Shank 98 has a length so that threaded stem 99 may be inserted through hole 84 of adapter 72 and through a shell of a grinding mill to engage nut 96 to compress rubber sealing washer 93 and metal washer 94 against the shell (not shown) and to couple liner assembly 70 to the shell of the grinding mill.

Figure 4:
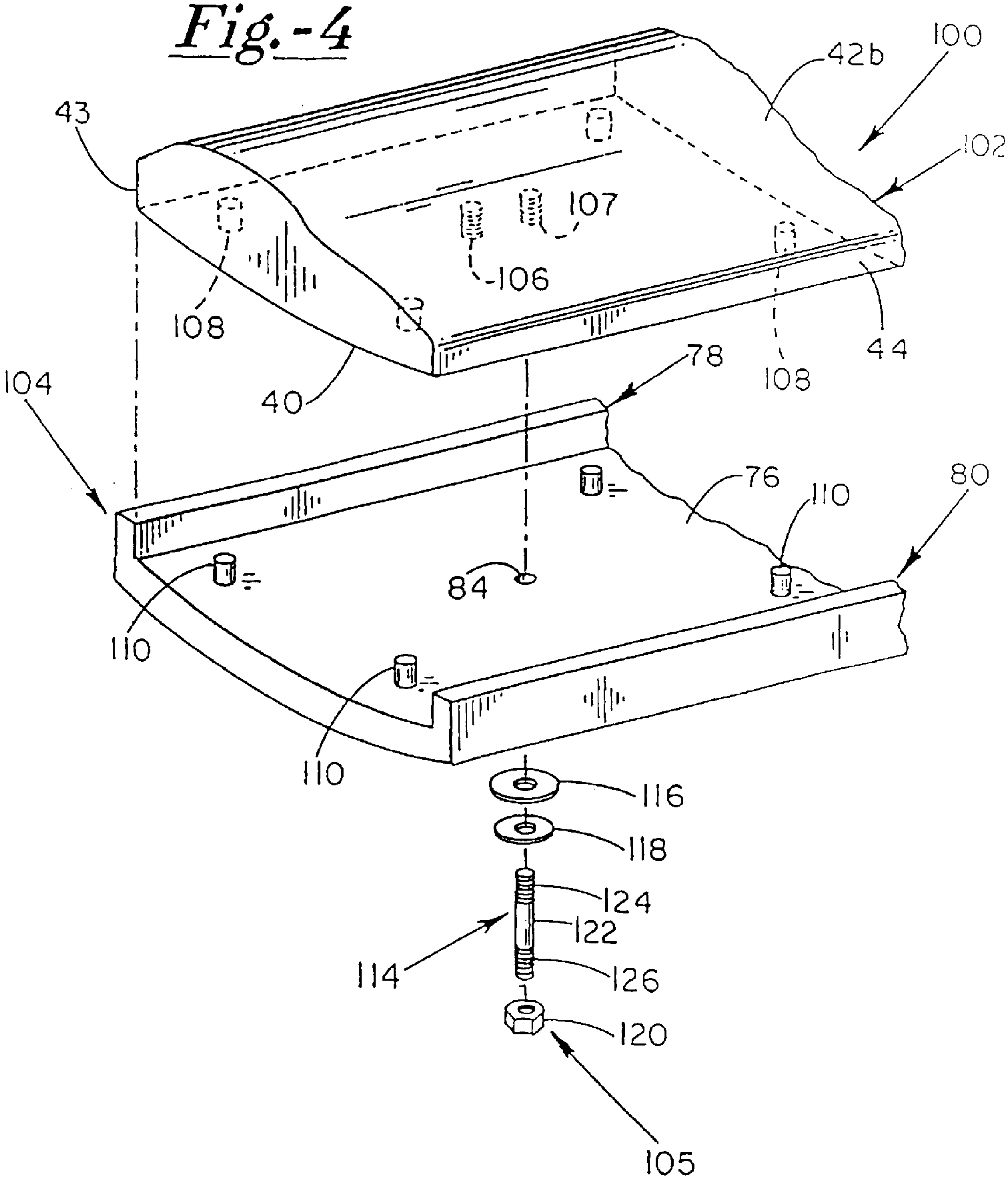
FIG. 4 is an alternate embodiment of the liner assembly of FIG. 3.

FIG. 4 shows an alternate embodiment (liner assembly 100 ) of liner assembly 70 shown in FIG. 3. For ease of illustration, only front portions of liner 102 and adapter 104 are shown. Remaining portions of liner 102 and adapter 104 are substantially identical to the front portions shown. For ease of illustration, those elements of liner assembly 100 which are the same as those elements of liner assembly 70 shown in FIG. 3 are numbered similarly. Liner assembly 100 includes liner 102, adapter 104 and coupling mechanism 105. Liner 102 is similar to liner 26 shown in FIG. 3, except that liner 102 includes threaded bores 106,107 in lieu of slot 48 and additionally includes four lug receiving bores 108. Bores 106 and 107 are axially centered between edges 43,44 along liner 102 and project upwardly into liner 102 from back face 40. Bore 106 is longitudinally positioned along liner 102 for threadably engaging a coupling member so that liner 102 may be coupled to a first grinding mill. Bore 107 is longitudinally positioned along liner 102 in alignment with mounting hole 84 of adapter 104 so that liner 102 may be coupled by coupling mechanism 105 to adapter 104 and to the shell of a grinding mill having different mounting hole spacings or pitches. Bores 108 are formed within liner 102 during the casting of liner 102 and extend into liner 102 from back face 40. Bores 108 are spaced apart from one another and are sized to receive corresponding lugs projecting from adapter 104.

Adapter 104 is similar to adapter 72 shown in FIG. 3, except that adapter 104 includes pins or lugs 110 in lieu of lugs 82 shown in FIG. 3. Lugs 110 preferably comprise cylindrically-shaped rods or pins which project above top face 76 of adapter 104. Lugs 110 are preferably integrally formed with adapter 104. Alternatively, lugs 110 are fixedly attached to adapter 104. Lugs 110 preferably have a height less than or equal to the depth of bores 108 within liner 102. Lugs 10 are spaced apart from one another and are positioned along adapter 104 so as to project into bores 108 of liner 102 when liner 102 is positioned adjacent to adapter 104. Lugs 110 and bores 108 allow liner 102 to be coupled to adapter 104 so that liner 102 and adapter 104 may be handled as a single piece during installation within the grinding mill. In addition, lugs 110 and bores 108 ensure accurate positioning of adapter 104 adjacent liner 102. Consequently, installation of liner 102 and adapter 104 within the grinding mill is easily accomplished in less time.

Coupling mechanism 105 includes an elongate stud 114, rubber sealing washer 116, metal washer 118 and nut 120. Stud 114 includes shank 122 and threaded ends 124 and 126. Threaded end 124 threadably engages threaded bore 107 within liner 102. Shank 122 has a length so that threaded end 126 may be inserted through adapter 104 and through a shell of a grinding mill to engage nut 120 to compress rubber sealing washer 116 and metal washer 118 against the shell (not shown) and to couple liner assembly 100 to the shell of the grinding mill.

FIG. 5 shows a perspective view of an alternate embodiment (liner assembly 130 ) of liner assembly 100 shown in FIG. 4. For ease of illustration, only front portions of liner 132 and adapter 134 are shown. Remaining portions of liner 132 and adapter 134 are substantially identical to the front portions shown. For ease of illustration, those elements of liner assembly 130 which are the same as those elements of liner assembly 100 are numbered similarly. Liner assembly 130 includes liner 132, adapter 134 and coupling mechanism 135. Liner 132 is similar to liner 102 except that liner 132 is sized so that a plurality of liners 132 fully occupy and cover an inner diameter of a selected grinding mill. Each liner 132 further includes slotted hole 136 in lieu of threaded bores 106 and 107. Hole 136 is preferably formed within liner 132 during the casting or fabrication of liner 132 and includes elongated bore 138, shoulder 139 and socket 140. Bore 138 extends through liner 102 from back face 40 to socket 140 where bore 138 widens to form shoulder 139. Bore 138 is preferably longitudinally slotted so that hole 136 may be aligned with holes in different mills having different spacings or pitches. As a result, liner 132 may be first mounted to a first mill and later remounted to a second dissimilar mill having differently spaced mounting holes. Socket 140 receives coupling mechanism 135 while shoulder 139 engages coupling mechanism 135 so that liner 132 may be coupled to a shell of a grinding mill.

Adapter 134 is similar to adapter 72 shown in FIG. 3 except that adapter 134 omits sidewalls 78 and 80 shown in FIG. 3. In contrast, adapter 134 has a width between sides 141 substantially equal to the width of liner 132 between edges 43,44. Adapter 134 is configured for use when a plurality of liners 132 fully occupy and line or protect the inner diameter of the grinding mill to which liner assembly 130 is mounted. As a result, adapter 134 permits liner 132 to be mounted to a dissimilar grinding mill while also permitting liner 132 to be fitted within the dissimilar grinding mill to fully protect the shell of the dissimilar grinding mill. In addition, because adapter 134 is completely positioned behind liner 132, adapter 134 is not substantially exposed to the abrasive and corrosive effect of materials being ground. Consequentially, adapter 134 has a longer useful life.

Coupling mechanism 135 couples liner assembly 120 to a shell of a grinding mill and includes bolt 142, rubber sealing washer 143, metal washer 144 and nut 145. Bolt 142 includes head 146, shank 147 and threaded stem 148. Head 143 is generally circular and is sized for reception within socket 140 of hole 136 against shoulder 139. Shank 147 extends through bore 138, through mounting hole 84 within adapter 134 and through a shell of a grinding mill (not shown) so that stem 148 threadably engages nut 145 to compress rubber sealing washer 143 and metal washer 144 against the shell and to couple liner assembly 130 to the shell.

Figure 6:
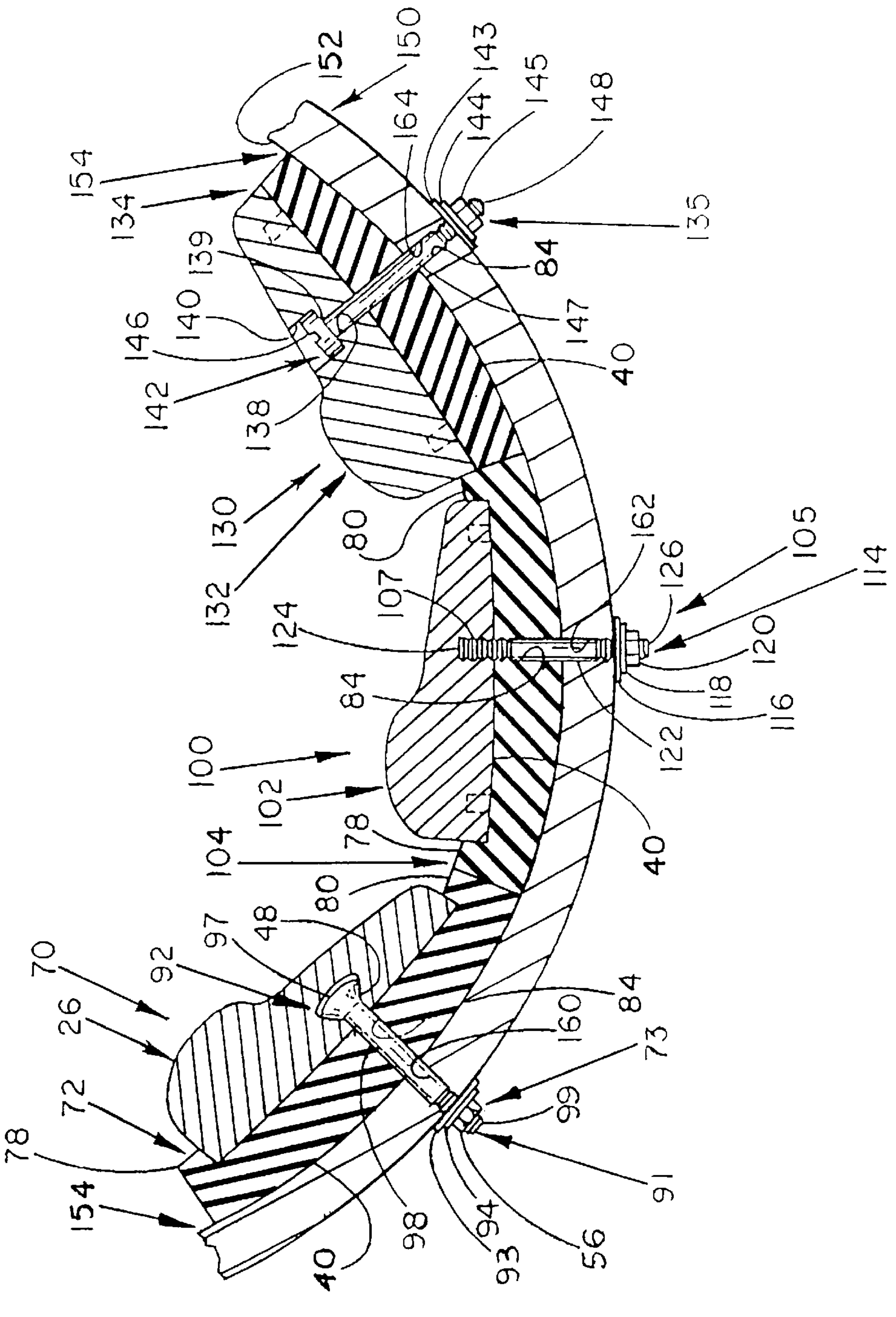
FIG. 6 is an enlarged fragmentary sectional view of the liner assemblies of FIGS. 3, 4 and 5 coupled to a shell of a grinding mill.

FIG. 6 illustrates liner assemblies 70, 100 and 130 coupled to grinding mill 150. Grinding mill 150 is dissimilar to grinding mill 10 shown in FIGS. 1 and 2 and includes cylindrical shell 152. Cylindrical shell 152 has an inner diameter contour having a radius smaller than the radius of the inner diameter contour of shell 12 of grinding mill 10 shown in FIG. 2. The smaller radius of shell 152 is exaggerated for illustrating the difference between shell 12 and shell 152. As a result, back faces 40 of liners 26, 102, and 132 do not correspond and mate with inner diameter 154 of shell 152 of grinding mill 150. In particular, each back face 40 of liners 26, 102, and 132 curves outwardly or arcs with a first larger radius corresponding to the larger radius of shell 12 of grinding mill 10 while shell 152 of grinding mill 140 curves inwardly with a second smaller radius. Thus, adapters 72, 104, and 134 are coupled between liners 26, 102, and 132, respectively, and shell 152 to establish conformity between liners 26, 102, and 132 and shell 152 to eliminate gaps and to prevent corrosion and damage to shell 152.

As shown by FIG. 6, shell 152 includes mounting holes 160, 162, and 164 spaced differently than mounting holes 60 of shell 12 shown in FIG. 2. As a result, coupling mechanisms 73, 105 and 135 allow liner assemblies 70, 100 and 130, respectively, to be mounted to shell 152 when the spacing between mounting openings of the liners and the mounting holes within the adapter and the shell have substantial spacing differences.

As shown by FIG. 6, shank 98 of bolt 92 extends through hole 84 and mounting hole 160 so that threaded stem 99 threadably engages nut 96 to couple liner assembly 70 to shell 152. Tightening of nut 96 further compresses adapter 72 into tight conformance with shell 152 to eliminate any gaps between liner assembly 70 and shell 152. Because head 97 may be slidably received at any point within V-shaped slot 48 of liner 26, liner 26 may be coupled to shell 152 regardless of longitudinal spacing of hole 84 and mounting hole 160. In addition, as previously shown in FIG. 3, the same slot 48 also allows liner 26 to be releasably coupled to adapter 72 for ease of installation.

As further shown by FIG. 6, shank 122 of stud 114 extends through hole 84 and mounting hole 162. Threaded end 124 engages threaded bore 107 and threaded end 126 threadably engages nut 120 to couple liner assembly 100 to shell 152. Tightening of nut 120 compresses adapter 104 against shell 152 to eliminate any gaps between adapter 104 and shell 152 to corrosively seal and protect shell 152.

Lastly, bolt 142 is received within socket 140 and extends through bore 138, hole 84 and mounting hole 164 so that threaded stem 148 engages nut 145 to couple liner assembly 130 to shell 152. Tightening of bolt 142 further compresses adapter 134 into tight conformance with shell 152 to eliminate spaces or gaps to corrosively protect and seal shell 152. Because hole 136 is longitudinally slotted, bolt 142 may be positioned within hole 136 at several different positions so as to be in alignment with hole 84 in adapter 134 and mounting hole 164 in shell 152. Thus, liner 132 may be mounted to shell 152 even when the hole spacing or pitches between shell 12 of grinding mill 10 and shell 152 of grinding mill 150 are unequal.

As shown by FIG. 6, sidewalls 78 and 80 of adapters 72 and 104 are preferably mounted into close, abutting contact with one another so as to fully occupy the gap or space between adjacent liners 26 and 102 and to form a seal therebetween for corrosively protecting shell 152. Similarly, sidewall 80 of adapter 172 may be mounted into abutting contact with adapter 134 and edge 43 of liner 132 to form a seal therebetween for corrosively protecting shell 152. Alternatively, when liner 132 is mounted to the shell of a grinding mill such that adjacent liners 132 fully occupy and seal the inner surface of the shell, liner assemblies 130 may be mounted to shell 152 so that edges 43, 44 of liner 132 abut and contact edges 43, 44 of adjacent liners 122 to form a seal therebetween to corrosively protect shell 152.

In conclusion, the present invention extends the useful life of a worn liner and allows liners configured for use in one grinding mill to be adapted for use in dissimilar grinding mills. Because the configuration of the liners allow them to be additionally used in other mills when worn, significant cost savings are achieved. When a liner configured for use in a first mill has been worn down through use to a point where the shape of its working face is no longer effective for use in that mill, but is still effective for use in a dissimilar mill, the worn liner is coupled to the dissimilar grinding mill. To couple the worn liner to the dissimilar grinding mill, an adapter is provided which has a top face configured for supporting a back face of the liner and a bottom face configured for mating with the dissimilar grinding mill. As a result, gaps between the adapter and the grinding mill are eliminated to corrosively protect and seal the grinding mill from the material being ground. In addition, the adapter of the present invention also occupies and seals gaps between adjacent liners to further protect and seal the grinding mill shell. To aid in installation of the adapters and liners of the liner assemblies, the adapters of the present invention include pins or lugs which engage the liners so that the liner and the adapter may be handled and installed as a single piece. Because different grinding mills may also have different mounting hole spacings or pitches, coupling mechanisms and special adaptations are made to the liners to allow the liner assemblies to be mounted to the dissimilar grinding mill. Consequently, the adapters permit liners which would otherwise be scrapped to be further used in grinding operations.

Although the present invention has been described with reference to preferred embodiments, workers skilled in the art will recognize that changes may be made in form and detail without departing from the spirit and scope of the invention.

What is claimed is:

1. A method for extending the useful life of a worn liner comprising the acts of:

providing a worn liner that has been used in a first grinding mill having a shell with an inner surface defining a first radius of curvature, the worn liner having a back face defining a back face radius of curvature that is substantially equal to the first radius of curvature;

providing an adapter having a top face for supporting the worn liner and a bottom face, the top face defining a top face radius of curvature that is substantially equal to the back face radius of curvature of the worn liner, and the bottom face defining a bottom face radius of curvature positioning the worn liner on the adapter such that the back face of the worn liner contacts the top face of the adapter; and mounting the worn liner and the adapter to a second grinding mill, the second grinding mill having a shell with an inner surface defining a second radius of curvature that is different from the first radius of curvature, such that the bottom face of the adapter contacts the inner surface of the shell of the second grinding mill, and the back face of the worn liner remains in contact with the top face of the adapter.

2. The method of claim 1 including:

coupling the worn liner to the adapter.

3. The method claim 1 wherein the liner includes a plurality of holes extending into a back face of the liner and wherein the top face of the adapter includes a plurality of lugs corresponding to the plurality of holes and wherein the step of positioning the liner on the adapter includes:

positioning the plurality of lugs of the adapter in the plurality of holes of the liner to couple the adapter to the liner.

4. The method of claim 1 wherein the back face radius of curvature of the worn liner curves outwardly with a first convexity and wherein the bottom face radius of curvature of the adapter curves outwardly with a second convexity larger than the first convexity.

5. The method of claim 1 wherein the step of providing an adapter includes:

providing an adapter having first and second sidewall portions, wherein the sidewall portions project above the top face and are spaced from one another to create a channel for securely receiving and holding the liner.

6. A method for extending the useful life of a worn liner mounted to a first inner diameter contour of a first grinding mill, the first grinding mill having a first grinding mill shell with a first grinding mill inner surface defining the first inner diameter contour, the method comprising the acts of:

removing the liner from the first grinding mill when the liner has been worn down through use to a point where the shape of its working face is no longer effective for use in the first grinding mill, but is effective for use in a second grinding mill;

positioning the liner on a top face of an adapter, the top face having a top face contour which substantially corresponds to the first inner diameter contour which is dissimilar from the top face contour; and coupling the adapter and the worn liner to the second grinding mill, the second grinding mill having a second grinding mill shell with a second grinding mill inner surface defining a second inner diameter contour, such that the second inner diameter contour substantially mates to a bottom face contour of the adapter, the second inner diameter contour being dissimilar to the first inner diameter contour of the first grinding mill.

7. The method of claim 6 wherein the liner has a working face with a lifting portion and an upwardly slanted leading portion adjacent and below the lifting portion for lifting materials in the first grinding mill and wherein the liner is removed from the first grinding mill when the lifting portion has worn so that a top surface of the lifting portion is contiguous with the leading portion.

8. The method of claim 6 wherein the liner includes a lifting portion for lifting material in the first grinding mill and wherein the liner is removed from the first grinding mill when the lifting portion of the liner has worn down through use to a point where the shape of its working face is no longer effective for use in the first grinding mill.

9. The method of claim 6 wherein the liner includes a plurality of holes extending into a back face of the liner and wherein the top face of the adapter includes a plurality of lugs corresponding to the plurality of holes and wherein the step of positioning the liner on the adapter includes:

positioning the plurality of lugs of the adapter in the plurality of holes of the liner to couple the adapter to the liner.

10. The method of claim 6 wherein the liner has a back face with a back face contour that curves outwardly with a first convexity and wherein the bottom face contour curves outwardly with a second convexity larger than the first convexity.

11. The method of claim 6 wherein the adapter has first and second sidewall portions, wherein the sidewall portions project above the top face and are spaced from one another to create a channel, wherein the liner is positioned at least partially within the channel.

12. The method of claim 6, wherein the second inner diameter contour is dissimilar to the first inner diameter contour by having a different radius of curvature.

13. A method for lining a first grinding mill having a first inner diameter contour, the method comprising the acts of:

providing a worn liner that has been used in a second grinding mill having a shell with an inner surface defining a second inner diameter contour, the worn liner having a back face with a back face contour substantially corresponding in mating relation to the second inner diameter contour of the second grinding mill, the second inner diameter contour being different than the first inner diameter contour of the first grinding mill;

providing an adapter having a top face with a top face contour substantially identical to the second inner diameter contour of the second grinding mill and a bottom face with a bottom face contour substantially corresponding in mating relation to the first inner diameter contour of the first grinding mill;

mounting the back face of the worn liner in mating relation against the top face of the adapter; and mounting the bottom face of the adapter in mating relation against the first inner diameter contour of the first grinding mill.

14. The method of claim 13 wherein the worn liner includes a plurality of holes extending into the back face of the liner and wherein the top face of the adapter includes a plurality of lugs corresponding to the plurality of holes and wherein the act of mounting the back face of the liner in mating relation against the top face of the adapter includes:

positioning the plurality of lugs of the adapter in the plurality of holes of the liner to couple the adapter to the liner.

15. The method of claim 13 wherein back face contour of the worn liner curves outwardly with the first convexity and wherein the bottom face contour of the adapter curves outwardly with a second convexity larger than the first convexity.

16. The method of claim 13 wherein the act of providing an adapter includes:

providing an adapter having first and second sidewall portions, wherein the sidewall portions project above the top face and are spaced from one another to create a channel for securely receiving and holding the liner.

17. The method of claim 13, wherein the second inner diameter contour is different from the first inner diameter contour by having a different radius of curvature.

* * * * *

UNITED STATES PATENT AND TRADEMARK OFFICE

CERTIFICATE OF CORRECTION

PATENT NO. : 5,832,583

DATED : NOVEMBER 10, 1998

INVENTOR(S) : MICHAEL WASON

It is certified that error appears in the above-identified patent and that said Letters Patent is hereby corrected as shown below:

Col. 4, line 48, delete “5a”, insert --51a--

Col. 9, line 45, delete “10", insert --110--

Col. 12, line 39, after “curvature”, insert --;--

Signed and Sealed this

Fourteenth Day of September, 1999

*Attest:*

Q. TODD DICKINSON

*Attesting Officer*

*Acting Commissioner of Patents and Trademarks*